May 19, 1959     S. A. SHERNO     2,887,668
BATTERY CABLE TERMINAL
Filed Jan. 20, 1956
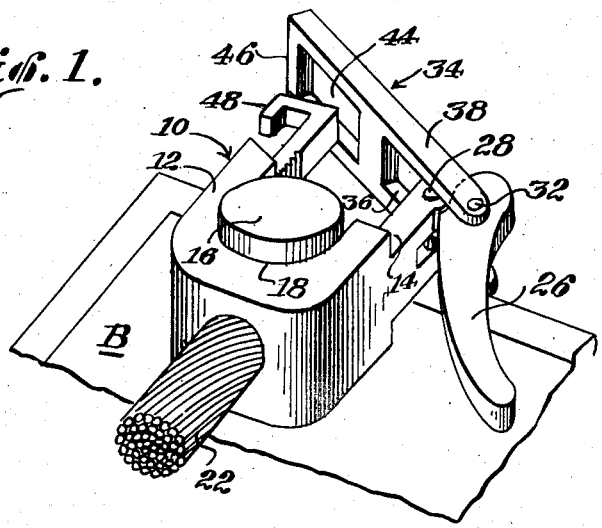
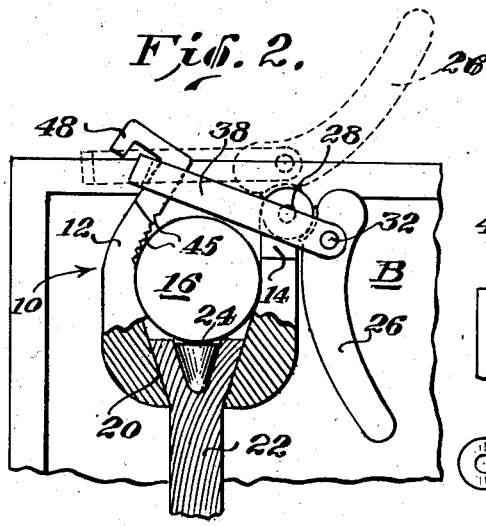
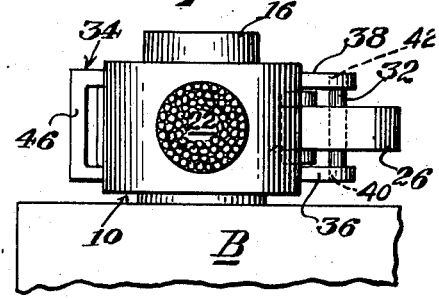
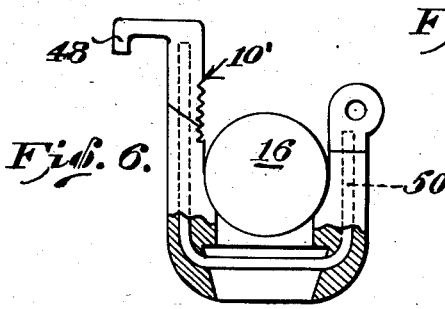
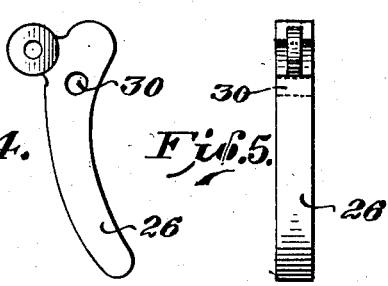
INVENTOR.
Stanley A. Sherno.
BY
C. Chandlee Pidgeon
Agent.

United States Patent Office 2,887,668
Patented May 19, 1959

2,887,668

BATTERY CABLE TERMINAL

Stanley A. Sherno, Hazleton, Pa., assignor to John Craig, Hazleton, Pa.

Application January 20, 1956, Serial No. 560,442

1 Claim. (Cl. 339—226)

This invention relates to an automobile battery cable terminal of the type that may be applied and removed without the use of tools.

An object of this invention is to provide a quick release battery cable terminal having a positive clamping action which does not require tools for its operation.

Another object of this invention is to provide a flip-lock battery cable terminal which grips the battery post by being deformed.

A further object of this invention is the provision of a deformable U-shaped battery post clamp having toggle operating means.

An additional object of this invention is the provision of a U-shaped battery post clamp having a link and a pivoted toggle lever for operating same.

These and other objects will appear in connection with the following specification and the accompanying drawings forming a part thereof.

In the drawings:

Fig. 1 is a perspective view of the battery terminal applied to a battery post, but not clamped;

Fig. 2 is a plan view partly in section showing the operating member in open and closed position;

Fig. 3 is an end view looking along the battery cable;

Fig. 4 is a plan view;

Fig. 5 is a rear view of the locking lever; and

Fig. 6 is a plan view partly in section similar to Fig. 2, showing a modification.

Referring now to Fig. 1 wherein numeral 10 refers to the battery terminal of my invention. The terminal 10 is a U-shaped member having substantially parallel legs 12 and 14 adapted to embrace a battery post 16 on a battery B. The bight of the U as at 18 is made arcuate to substantially encompass the battery post, and the legs 12 and 14 are made substantially longer than the diameter of the post 16 for a purpose which will appear hereinafter.

In the bight 18 of the U there is a tapered opening 20 for the battery cable 22 which is firmly clamped in place by the cone 24, which engages the battery post 16 when the terminal is in place.

A lever 26 is pivoted at 28 on the leg 14 of member 10 and has an opening 30 to accommodate a pin 32 in one end of a link 34. The link 34 is bifurcated as at 36, 38 and the bifurcations straddle the end of lever 26 and are provided with aligned openings 40, 42 which accommodate pin 32. The opening 44 in the other end of the link 34 passes over leg 12 in the dotted line position, Fig. 2, and when the lever is swung to the full line position, the leg 12 is bent about the post. The leg 14 is slightly shorter and somewhat heavier than the leg 12, so that no appreciable bending occurs. To facilitate bending of the leg 12 and to prevent bulging of the metal, the inner face of the leg is notched as at 45.

In the clamping position, as noted in full lines in Fig. 2, the pin 32 is positioned below the pivot 28, to form a locking toggle. The clamp cannot be opened accidentally and forms a firm securing means for the battery terminal, permitting the terminal to be applied or removed without the use of tools. In clamping the terminal 10 to the post 16, the cone 24 will be forced into the end of the cable causing the periphery thereof to firmly engage the cone-shaped opening 20 in the terminal 10.

It will be appreciated that the clamp, being made of lead or lead alloy, may not spring back to normal position when opened. The lug 48 is provided to assist this operation, the bar 46 at the end of the link 34 engaging the lug 48, as the lever is rotated in a counter-clockwise direction to unlock the toggle, to force the clamp open.

As a further means of aiding the opening of the clamp, a clamp 10' may be formed with a U-shaped core 50 of spring metal as illustrated in Fig. 6. Such a core adds resilience to the clamp.

It should now be apparent that I have devised a simple effective clamp terminal for battery cables and the like, which at one operation fixes itself firmly to the cable and is clamped onto the battery post. I have provided a device simple to produce, consisting of three main parts and two pivot pins, and which requires no soldering or fusing to attach to the battery cable and is applied to both the cable and the battery post without the use of tools.

Having now described the preferred embodiment of my invention, I desire it to be understood that modifications may be resorted to within the skill of the art and within the bounds of the appended claim.

I claim:

A quick release battery terminal comprising a unitary substantially U-shaped clamping member adapted to embrace a battery post, said member having one long leg and one short leg and having a socket to retain a battery cable, a swinging lever pivoted on the shorter leg, a link pivoted on the lever adjacent the pivotal point thereof, said link engaging the longer leg to bend same about a battery post to clamp the terminal thereon, a lug on said longer leg engageable by said link to force said clamp open and means for tightening a cable in said socket during clamping operation.

References Cited in the file of this patent

UNITED STATES PATENTS

| | | |
|---|---|---|
| 1,503,247 | Rouzer | July 29, 1924 |
| 1,754,053 | Schlaegel | Apr. 8, 1930 |
| 1,820,429 | Bohan | Aug. 25, 1931 |
| 2,657,370 | Hobson | Oct. 27, 1953 |
| 2,706,284 | Hoggatt | Apr. 12, 1955 |